United States Patent [19]
Kuribayashi et al.

[11] Patent Number: 5,802,230
[45] Date of Patent: Sep. 1, 1998

[54] OPTICAL SEMICONDUCTOR MODULE

[75] Inventors: Masaki Kuribayashi; Kazuhiko Kobayashi; Shunichi Sato, all of Sapporo; Hironao Hakogi, Kawasaki, all of Japan

[73] Assignee: Fujitsu Limited, Kawasaki, Japan

[21] Appl. No.: 912,983

[22] Filed: Aug. 12, 1997

[30] Foreign Application Priority Data

Mar. 5, 1997 [JP] Japan ................... 9-050420

[51] Int. Cl.$^6$ .................................. G02B 6/36
[52] U.S. Cl. .................. 385/92; 385/88; 385/90; 385/91
[58] Field of Search ................ 385/88, 89, 90, 385/91, 92, 93, 94

[56] References Cited

U.S. PATENT DOCUMENTS

| | | | |
|---|---|---|---|
| 4,166,668 | 9/1979 | MacLeod | 385/94 |
| 5,042,891 | 8/1991 | Tal | 385/88 |
| 5,216,737 | 6/1993 | Driessen et al. | 385/93 |

FOREIGN PATENT DOCUMENTS

| | | | |
|---|---|---|---|
| 63-316812 | 12/1988 | Japan | 385/93 |

*Primary Examiner*—Rodney B. Bovernick
*Assistant Examiner*—Quyen Phan Leung
*Attorney, Agent, or Firm*—Staas & Halsey

[57] ABSTRACT

An optical semiconductor module including a housing (54), an optical semiconductor assembly (56), a movable ferrule (84), and a sleeve (60). The housing (54) has a hole (80) into which a connector ferrule (76) is inserted. The optical semiconductor assembly (56) is accommodated in the housing (54). An optical fiber (74,82) having a first end (82a) and a second end (82b) is fixed in the movable ferrule (84). The movable ferrule (84) has a thin hole (84a) in which the second end (82b) of the optical fiber (82) is inserted and fixed. The first end (82a) of the optical fiber (82) is supported so as to be optically coupled to the optical semiconductor assembly (36). The sleeve (60) is accommodated in the hole (80) of the housing (54), so as to align the movable ferrule (84) and the connector ferrule (76) with each other. The movable ferrule (84) is biased so as to be pressed against the connector ferrule (76) in the sleeve (60). With this configuration, even if an optical connector is repeatedly mounted/demounted with respect to the optical semiconductor module, a high efficiency of optical coupling between the optical connector and the optical semiconductor assembly (56) can be stably maintained, thus providing an optical semiconductor module having a high reliability.

12 Claims, 17 Drawing Sheets

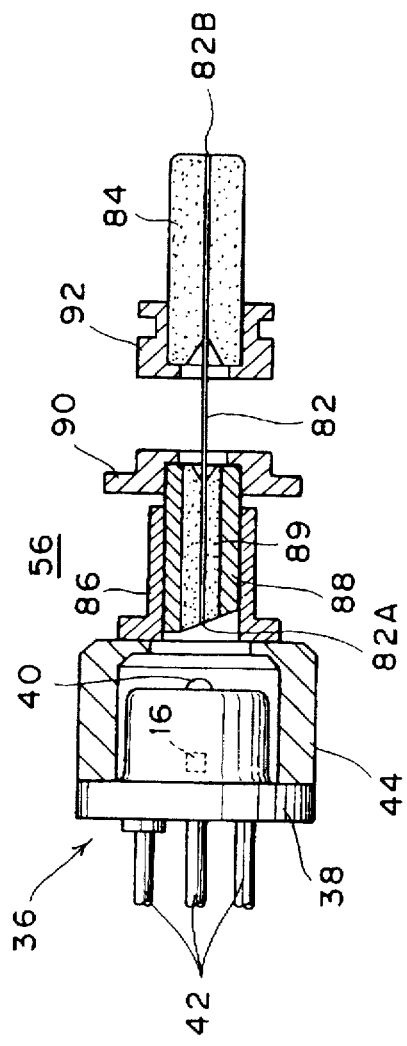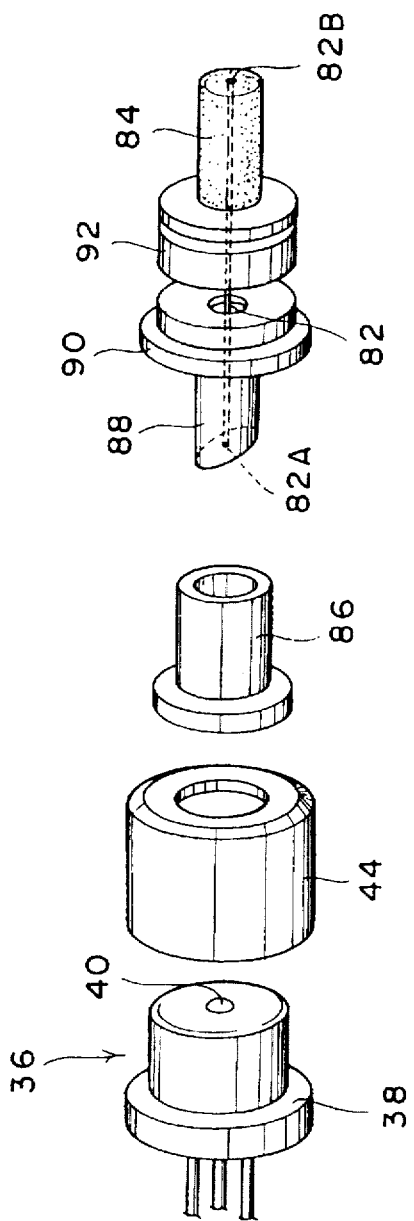

F I G. 16
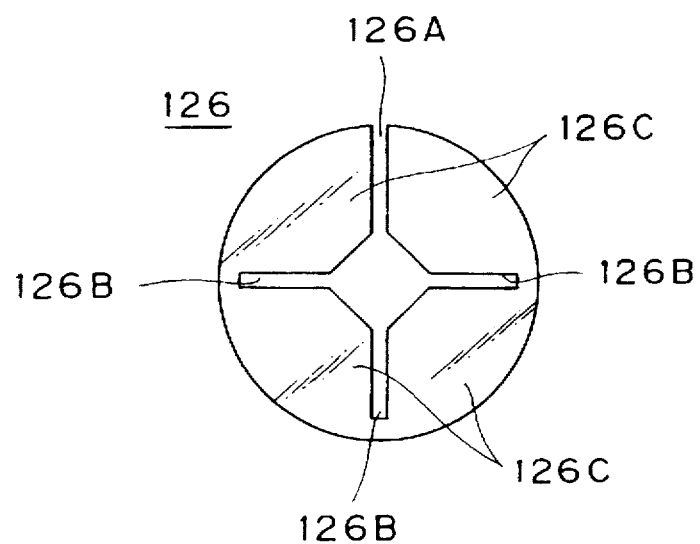

OPTICAL SEMICONDUCTOR MODULE

BACKGROUND OF THE INVENTION

1. Field of the Invention

The present invention relates to an optical semiconductor module used to perform electro/optical conversion (E/O conversion) and/or opto/electrical conversion (O/E conversion) in electronic equipment such as a transmission device.

2. Description of the Related Art

An optical semiconductor module has a demountable optical connector for adaptation to automation of manufacturing, for example, and an optical semiconductor module having a high reliability which can endure repetition of mounting/demounting of the optical connector is required.

Referring to FIG. 1, there is shown a perspective view of electronic equipment to which the present invention is applicable. In FIG. 1, a telephone exchange 2 is shown as the electronic equipment. The exchange 2 is provided with a rack 4 and a plurality of plug-in units 6 mounted in the rack 4 in a plug-in manner. Each plug-in unit 6 has a mother board 8, an optical semiconductor module 10 mounted on the mother board 8, and a connector 12 for electrically connecting the mother board 8 to another unit or device.

FIG. 2 is a perspective view of an optical semiconductor module 10 in the prior art. The optical semiconductor module 10 has a housing 14, optical semiconductor chips 16, and a printed wiring board 18. The optical semiconductor chips 16 and the printed wiring board 18 are accommodated in the housing 14. Each optical semiconductor chip 16 is a light emitting element such as an LD (laser diode) and an LED (light emitting diode) or a photodetector such as a PD (photodiode). Each optical semiconductor chip 16 is electrically connected to the printed wiring board 18. The printed wiring board 18 has a plurality of lead pins 20 for mounting the optical semiconductor module 10 on the mother board 8 (see FIG. 1). The optical semiconductor module 10 is provided with demountable optical connectors 22. In a mounted condition of each optical connector 22 to the optical semiconductor module 10, the optical connector 22 is optically connected to the corresponding optical semiconductor chip 16. Each optical connector 22 is connected through an optical fiber 24 to another optical connector 26 adapted to be connected to another device.

FIG. 3 is a partially cutaway, sectional view of the optical semiconductor module 10 shown in FIG. 2. The optical connector 22 has a connector housing 28 and a ferrule 32 supported by a spring 30 in the connector housing 28. The optical fiber 24 is inserted and fixed in a thin hole of the ferrule 32, and an end face of the optical fiber 24 is exposed at a front end of the ferrule 32. In correspondence with the ferrule 32 of the optical connector 22, the optical semiconductor module 10 has a ferrule 34. When the optical connector 22 is mounted to the optical semiconductor module 10, the ferrules 32 and 34 abut against each other in alignment with each other, thereby optically connecting the optical fiber 24 and the optical semiconductor chip 16.

Referring to FIG. 4, there is shown a more detailed sectional structure of the optical semiconductor module 10. The optical semiconductor chip 16 is provided by an optical semiconductor assembly 36. The assembly 36 has a package 38 accommodating the chip 16, a lens 40 provided in opposed relationship to the chip 16, and leads 42 for connecting the chip 16 to the printed wiring board 18. The optical semiconductor assembly 36 is fixed to a holder 44. The holder 44 is fixed to the housing 14. An optical fiber 46 is inserted and fixed in a thin hole of the ferrule 34 in correspondence with the optical fiber 24 of the optical connector 22. The ferrule 34 is fixed through a sleeve member 48 and a fixed flange member 50 to the holder 44, thereby maintaining a relative positional relation between the ferrule 34 and the optical semiconductor assembly 36.

A substantially half portion of the ferrule 34 on its front side is inserted in an elastically deformable sleeve (slitted sleeve) 52 having an axial slit. The sleeve 52 serves to align the ferrules 32 and 34 with each other in mounting the optical connector 22 to the optical semiconductor module 10. That is, when the ferrule 32 is inserted into the sleeve 52, an end face of the optical fiber 24 comes into close contact with an end face of the optical fiber 46 in alignment with each other. As a result, the optical fiber 24 of the optical connector 22 is optically connected to the optical semiconductor chip 16 by the lens 40 and the optical fiber 46.

The elements in the sectional structure shown in FIG. 4 are fixed to each other in the following manner, for example. The package 38 and the holder 44 are fixed by ring projection welding. The holder 44 and the fixed flange member 50 are fixed by laser spot welding. The fixed flange member 50 and the sleeve member 48 are fixed by laser penetration welding. The holder 44 and the housing 14 are bonded by potting.

If the ferrule 32 is inclined with respect to the sleeve 52 in mounting the optical connector 22 to the optical semiconductor module 10, a stress due to the inclination of the ferrule 32 exerts an influence upon each fixed portion. Of all the fixed portions, the fixed portion between the holder 44 and the flange member 50 is particularly susceptible to the stress. More specifically, the stress applied causes axial misalignment or angular misalignment of the optical fiber 46, resulting in a reduction in coupling efficiency. An axial misalignment tolerance and an angular misalignment tolerance allowing a reduction of 0.5 dB in coupling efficiency are 2 μm and 1.5°, respectively, for example. The strength of each fixed portion is set so as to enough endure the mounting operation of the optical connector 22. However, when mounting/demounting of the optical connector 22 is repeated, the reduction in coupling efficiency occurs constantly, causing a reduction in reliability of the optical semiconductor module.

SUMMARY OF THE INVENTION

It is therefore an object of the present invention to provide an optical semiconductor module having a high reliability which can endure repetition of mounting/demounting of an optical connector.

In accordance with the present invention, there is provided an optical semiconductor module including a housing, an optical semiconductor assembly, a movable ferrule, and a sleeve. The housing has a hole into which a connector ferrule is inserted. The optical semiconductor assembly is accommodated in the housing. An optical fiber having a first end and a second end is fixed in the movable ferrule. The movable ferrule has a thin hole in which the second end of the optical fiber is inserted and fixed. The first end of the optical fiber is supported so as to be optically coupled to the optical semiconductor assembly. The sleeve is accommodated in the hole of the housing, so as to align the movable ferrule and the connector ferrule with each other. The movable ferrule is biased so as to be pressed against the connector ferrule in the sleeve.

In this configuration, the first end of the optical fiber is optically coupled to the optical semiconductor assembly, and the second end of the optical fiber is movable together with the movable ferrule. In general, the optical fiber has flexibility, so that a stress applied to the optical fiber by the connector ferrule in mounting the optical connector is absorbed by the movement of the movable ferrule. Accordingly, even if the optical connector is repeatedly mounted/demounted with respect to the optical semiconductor module, a high efficiency of optical coupling between the optical connector and the optical semiconductor assembly can be stably maintained, thus providing an optical semiconductor module having a high reliability.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 8A and 8B are a sectional view and an exploded perspective view of an optical assembly 56, respectively;

FIG. 16 is an elevational view of a leaf spring member 126; and

DETAILED DESCRIPTION OF THE PREFERRED EMBODIMENTS

Figure 1:
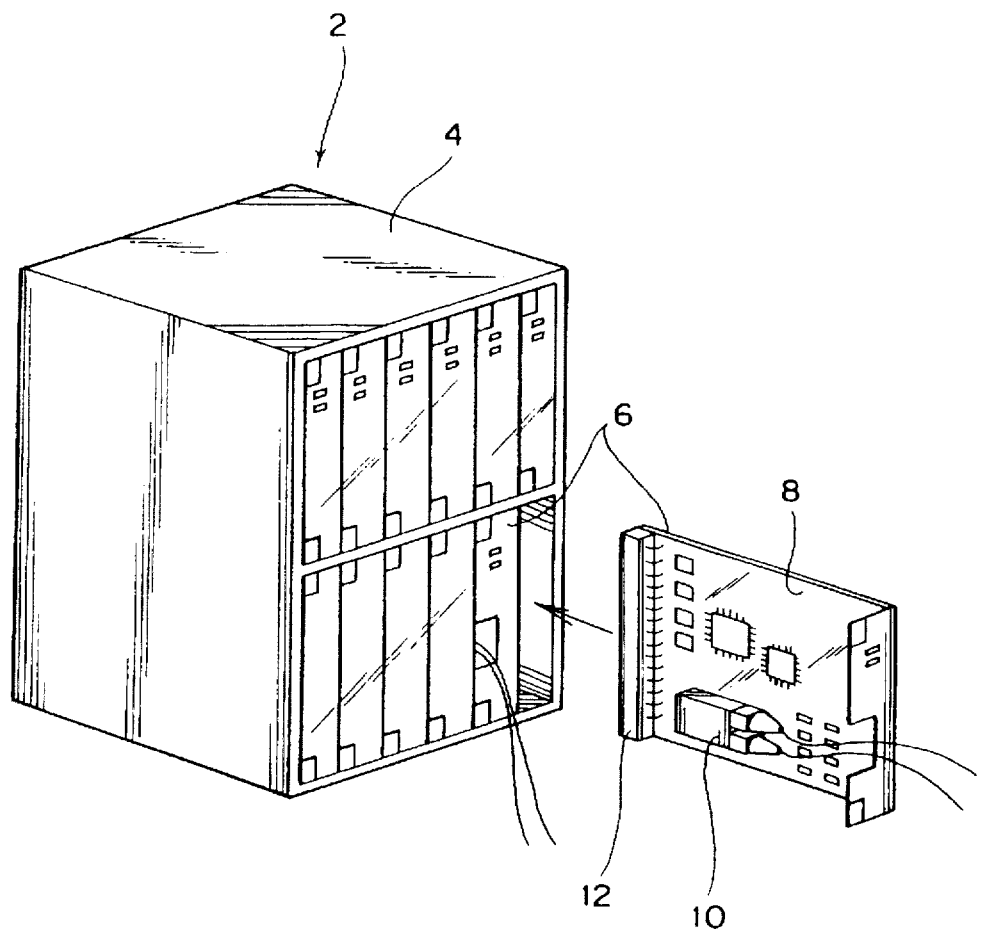
FIG. 1 is a perspective view of electronic equipment to which the present invention is applicable.
Figure 2:
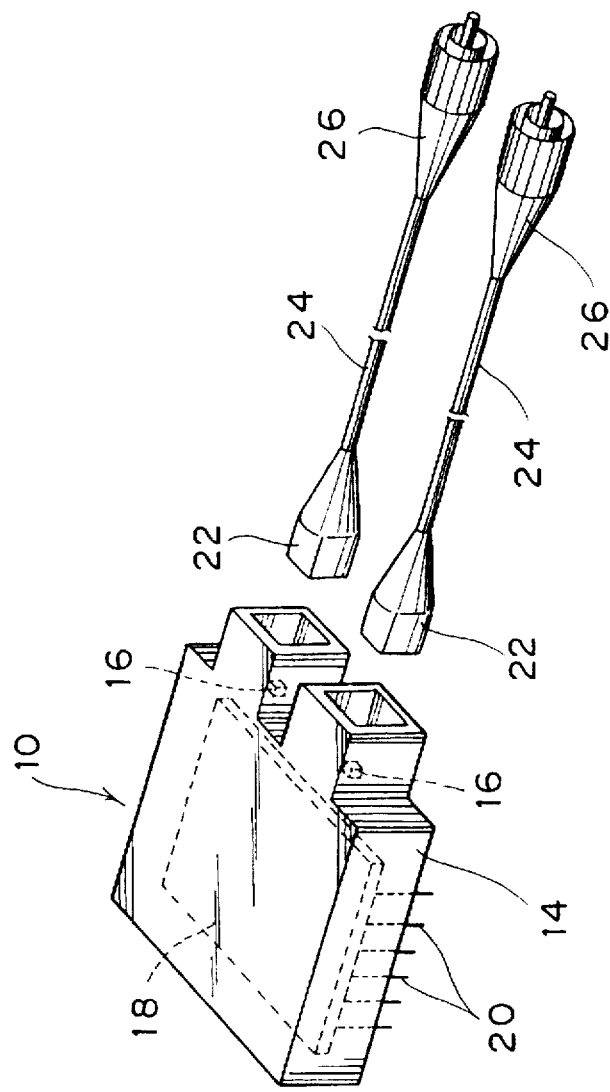
FIG. 2 is a perspective view of an optical semiconductor module in the prior art.
Figure 3:
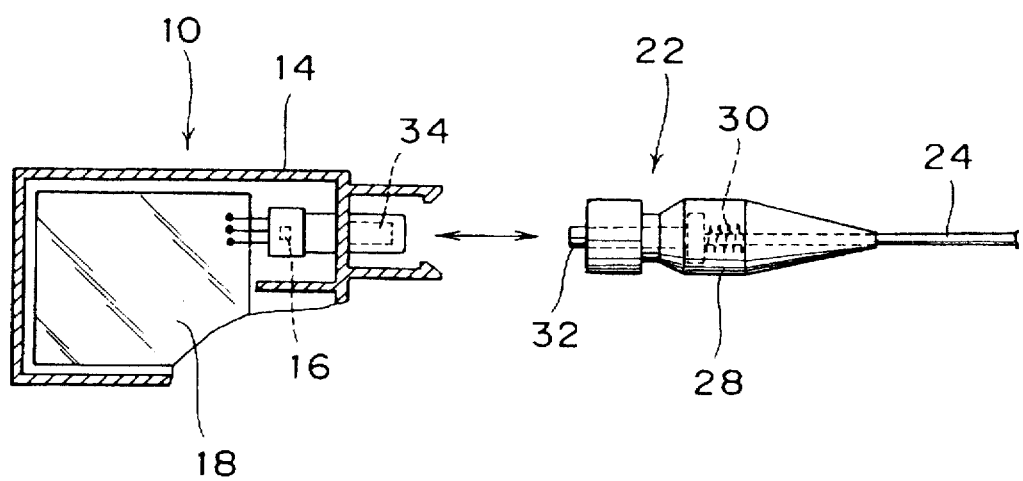
FIG. 3 is a partially cutaway, sectional view of the optical semiconductor module shown in FIG. 2.

Some preferred embodiments of the present invention will now be described in detail. Throughout the drawings, substantially the same parts are denoted by the same reference numerals, and the description of the parts denoted by the same reference numerals may be omitted to avoid repetition.

Figure 4:
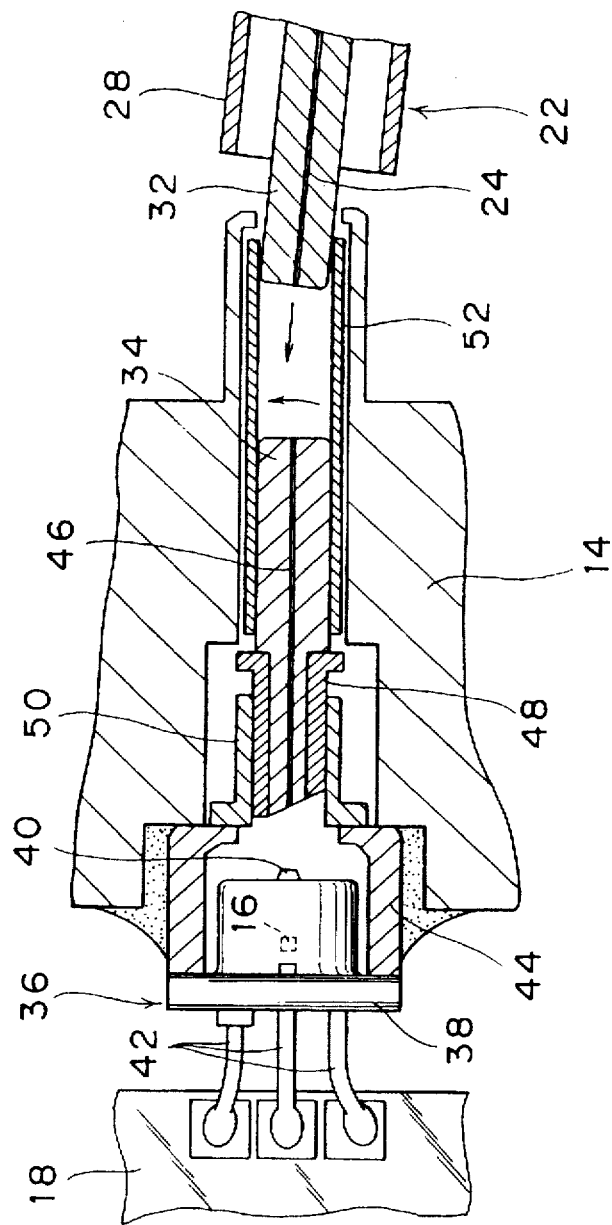
FIG. 4 is a sectional view of an essential part of the optical semiconductor module shown in FIG. 2, for illustrating a problem in the prior art.
Figure 5:
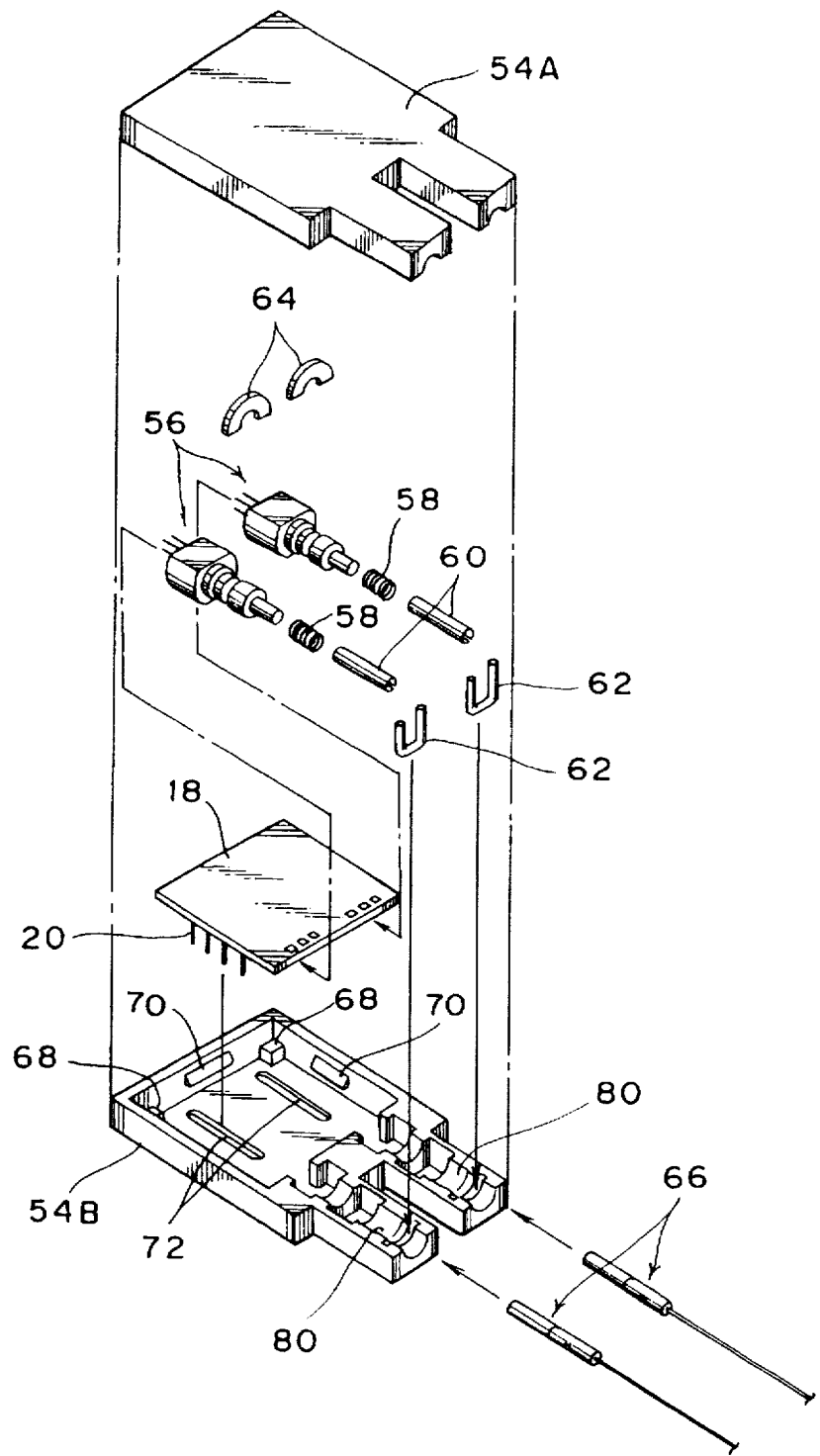
FIG. 5 is an exploded perspective view showing a first preferred embodiment of the optical semiconductor module according to the present invention.
Figure 6:
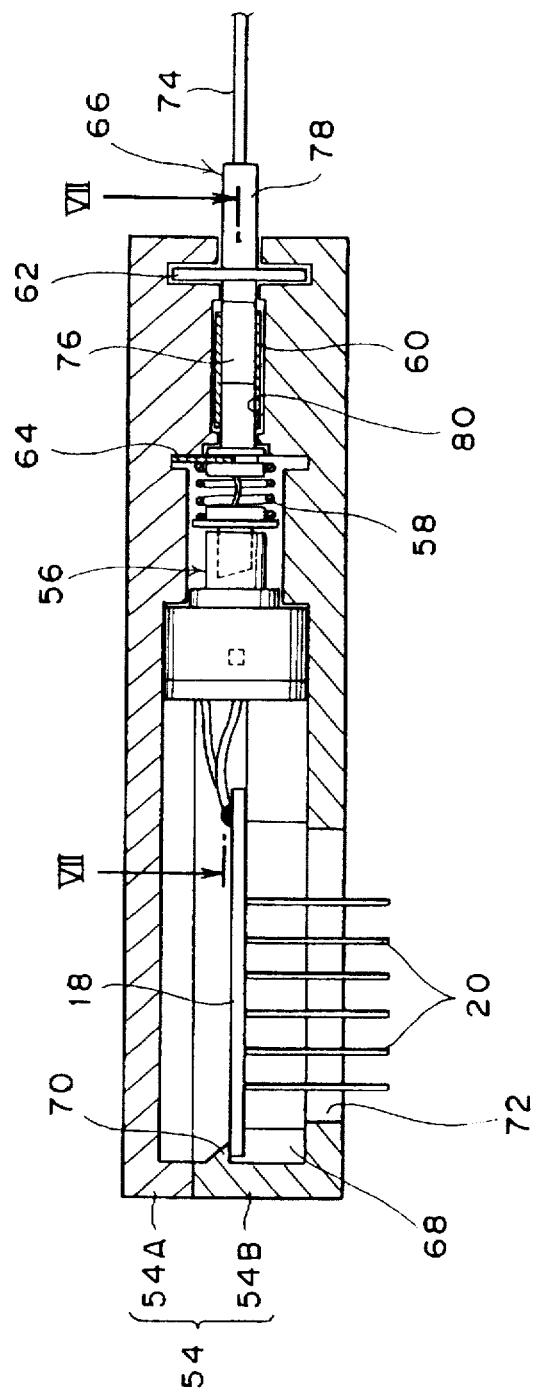
FIG. 6 is a sectional view showing the first preferred embodiment of the optical semiconductor module according to the present invention.

FIG. 5 is an exploded perspective view showing a first preferred embodiment of the optical semiconductor module according to the present invention, and FIG. 6 is a sectional view of the module shown in FIG. 5. This optical semiconductor module has a housing 54 consisting of an upper case 54A and a lower case 54B, and various elements are accommodated in the housing 54. These elements include two optical assemblies 56, two coil springs 58 corresponding to optical assemblies 56, two sleeves 60 (each corresponding to the sleeve 52 shown in FIG. 4), two U-shaped springs 62, and two stoppers 64. The coil springs 58, the sleeves 60, the U-shaped springs 62, and the stoppers 64 are provided so as to correspond to the optical assemblies 56. In correspondence with the two optical assemblies 56, two optical connectors 66 are mountable/demountable with respect to this optical semiconductor module.

A printed wiring board 18 to which the optical assemblies 56 are connected is nipped between corner blocks 68 and hooks 70 both integrally provided on the inside surface of the lower case 54B, thereby being fixed in the lower case 54B. The printed wiring board 18 has a plurality of lead pins 20 for solder-mounting this optical semiconductor module to the mother board 8 shown in FIG. 1, for example. In the condition where the printed wiring board 18 is fixed in the lower case 54B, the lead pins 20 extend through two openings 72 formed through the bottom wall of the lower case 54B and project downward from the openings 72.

As well shown in FIG. 6, each optical connector 66 is provided with a connector ferrule 76 in which an optical fiber 74 is introduced and a rotating member 78 rotatably provided on the connector ferrule 76. The details of the optical connector 66 characteristic of this preferred embodiment will be described later. The housing 54 has two holes 80 into which the connector ferrules 76 are adapted to be inserted.

Figure 7:
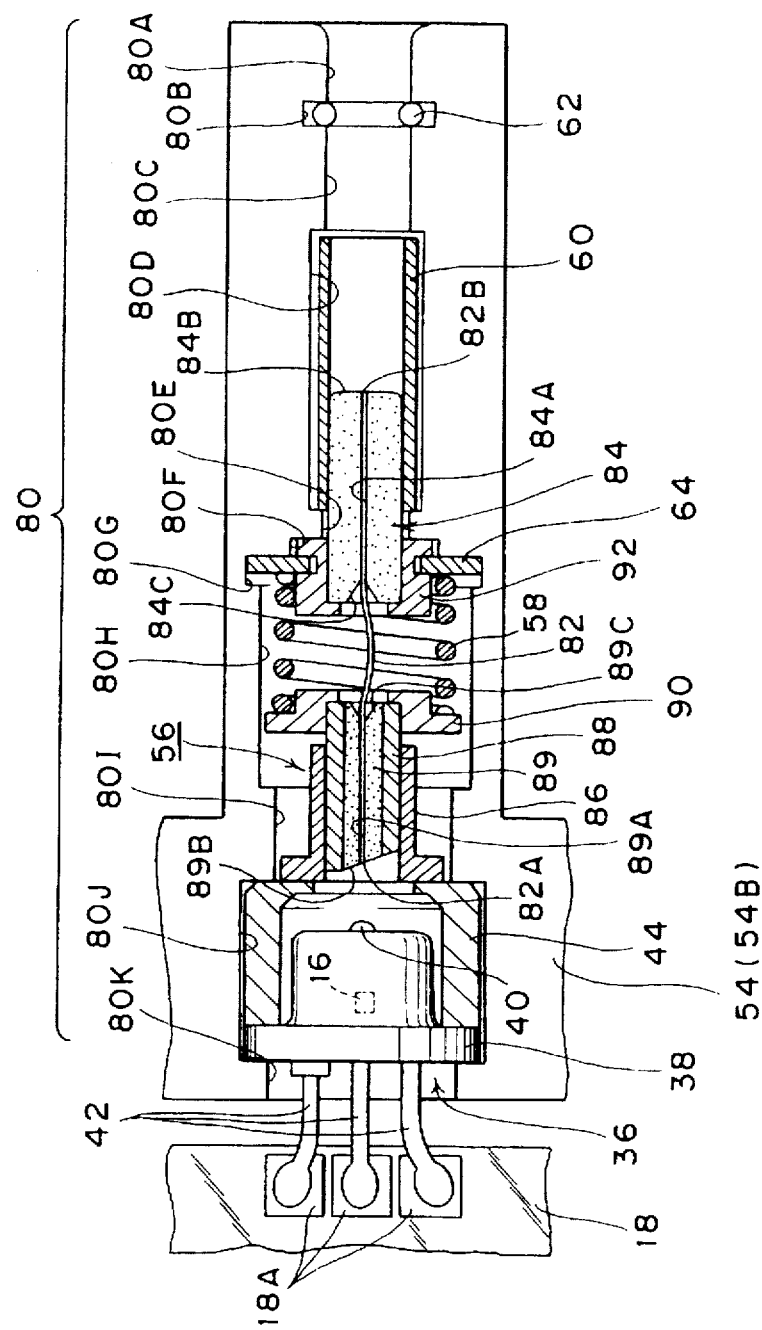
FIG. 7 is a cross section taken along the line VII—VII in FIG. 6.

Referring to FIG. 7, there is shown a sectional structure taken along the line VII—VII in FIG. 6. Each hole 80 of the housing 54 is composed of a first portion 80A larger in diameter than the connector ferrule 76 (see FIG. 6), a second portion 80B larger in diameter than the first portion 80A, a third portion 80C having the same diameter as that of the first portion 80A, a fourth portion 80D slightly larger in diameter than the third portion 80C, a fifth portion 80E having the same diameter as that of the third portion 80C, a sixth portion 80F larger in diameter than the fifth portion 80E, a seventh portion 80G larger in diameter than the sixth portion 80F, an eighth portion 80H smaller in diameter than the seventh portion 80G and larger in diameter than the sixth portion 80F, a ninth portion 80I smaller in diameter than the eighth portion 80H, a tenth portion 80J larger in diameter than the ninth portion 80I, and an eleventh portion 80K smaller in diameter than the tenth portion 80J. The first to eleventh portions 80A to 80K are formed in this order in a direction of insertion of the connector ferrule 76 into the hole 80.

The U-shaped spring 62 is seated in the second portion 80B, and a pair of spring pins of the U-shaped spring 62 are retractable into the second portion 80B in inserting the connector ferrule 76, thereby facilitating mounting/demounting of the optical connector 66 (see FIGS. 5 and 6) (this operation will be described later in more detail).

The sleeve 60 is loosely accommodated in the fourth portion 80D. More specifically, the length of the sleeve 60 is set at a value slightly smaller than the length of the fourth portion 80D; the outer diameter of the sleeve 60 is set at a value between the diameter of the third portion 80C and the diameter of the fourth portion 80D; and the inner diameter of the sleeve 60 is set at a value smaller than the diameter of the third portion 80C.

The optical assembly 56 includes an optical semiconductor assembly 36 having an optical semiconductor chip 16, an optical fiber 82 having a first end 82A and a second end 82B, and a movable ferrule 84 having a thin hole 84A in which the second end 82B of the optical fiber 82 is inserted and fixed. A substantially half portion of the movable ferrule 84 is inserted in the sleeve 60 in close contact with each other, so that the movable ferrule 84 is slidable in the sleeve 60 in the axial direction of the optical fiber 82. The first end 82A of the optical fiber 82 is optically coupled to the optical semiconductor chip 16. To effect such optical coupling, the optical semiconductor assembly 36 has a package 38 accommodating the optical semiconductor chip 16 and a lens 40 opposed to the optical semiconductor chip 16. The assembly 36 further has three leads 42 for electrically connecting the optical semiconductor chip 16 to an electronic circuit on the printed wiring board 18. Each lead 42 is fixed to a conductor pad 18A on the printed wiring board 18 by soldering, for example.

In the case that this optical semiconductor module is an optical transmitting module, the optical semiconductor chip 16 is a light emitting element such as an LD (laser diode) and an LED (light emitting diode), whereas in the case that this optical semiconductor module is an optical receiving module, the optical semiconductor chip 16 is a photodetector such as a PD (photodiode). For example, in the case that the optical semiconductor chip 16 is an LD, a photodiode (not shown) for monitoring an output from the LD is accommodated in the package 38, and a pair of electrodes of the photodiode and a pair of electrodes of the LD are connected to the three leads 42 (ground electrodes are common).

The efficiency of optical coupling between the optical semiconductor chip 16 and the optical fiber 82 is determined by the relative positional relation between the chip 16, the lens 40, and the first end 82A of the optical fiber 82. Accordingly, the first end 82A is positioned so that the coupling efficiency becomes maximum. For positioning of the first end 82A, a holder 44, a fixed flange member 86, a fixed sleeve 88, and a fixed ferrule 89 are used. The fixed ferrule 89 has a thin hole 89A in which the first end 82A of the optical fiber 82 is inserted and fixed. The fixed ferrule 89 is inserted and fixed in the fixed sleeve 88. The fixed sleeve 88 is inserted and fixed in the fixed flange member 86. The fixed flange member 86 is fixed to the holder 44. The holder 44 is fixed to the package 38.

To reduce an influence due to reflection on the first end 82A of the optical fiber 82, the first end 82A and an end face 89B of the fixed ferrule 89 are flush with each other, and have a polished surface inclined with respect to the axial direction of the optical fiber 82. Another end face of the fixed ferrule 89 opposite to the end face 89B is formed with a conical tapering recess 89C for introducing the optical fiber 82 into the thin hole 89A. The second end 82B of the optical fiber 82 and an end face 84B of the movable ferrule 84 are flush with each other and have a polished surface. Another end face of the movable ferrule 84 opposite to the end face 84B is formed with a conical tapering recess 84C for introducing the optical fiber 82 into the thin hole 84A.

A movable flange member 92 is fixed to a part of the outer circumference of the movable ferrule 84 on the tapering recess 84C side, and a C-shaped stopper 64 (see FIG. 5) is engaged with a groove formed on the outer circumference of the movable flange member 92. The stopper 64 is movable in the axial direction of the optical fiber 82 within the seventh portion 80G of the hole 80. In this preferred embodiment, a coil spring 58 is used to bias the movable ferrule 84 in such a direction as to move it away from the fixed ferrule 89. A ring member 90 is fixed to the fixed sleeve 88, and the coil spring 58 is interposed between the ring member 90 and the stopper 64.

Referring to FIGS. 8A and 8B, there are shown a sectional view and an exploded perspective view of the optical assembly 56, respectively. An example of a fixing method for the elements of the assembly 56 will now be described. In this preferred embodiment, the elements are formed of the following materials. That is, the movable ferrule 84 and the fixed ferrule 89 are formed of ceramics; the package 38, the fixed flange member 86, the fixed sleeve 88, the ring member 90, and the movable flange member 92 are formed of SUS material; and the holder 44 is formed of koval.

The package 38 and the holder 44 are fixed to each other by ring projection welding. The holder 44 and the fixed to each other by laser spot welding. The fixed flange member 86 and the fixed sleeve 88 are fixed to each other by laser penetration welding. The fixed ferrule 89 is fixed to the fixed sleeve 88 by press fitting. The ring member 90 is fixed to the fixed sleeve 88 by press fitting or welding. The movable sleeve 92 is fixed to the ferrule 84 by press fitting. By adopting such a fixing method for the elements and suitably setting the fixing order, the efficiency of optical coupling between the optical semiconductor chip 16 and the optical fiber 82 can be easily adjusted in a manufacturing process of the optical assembly 56.

Figure 9:
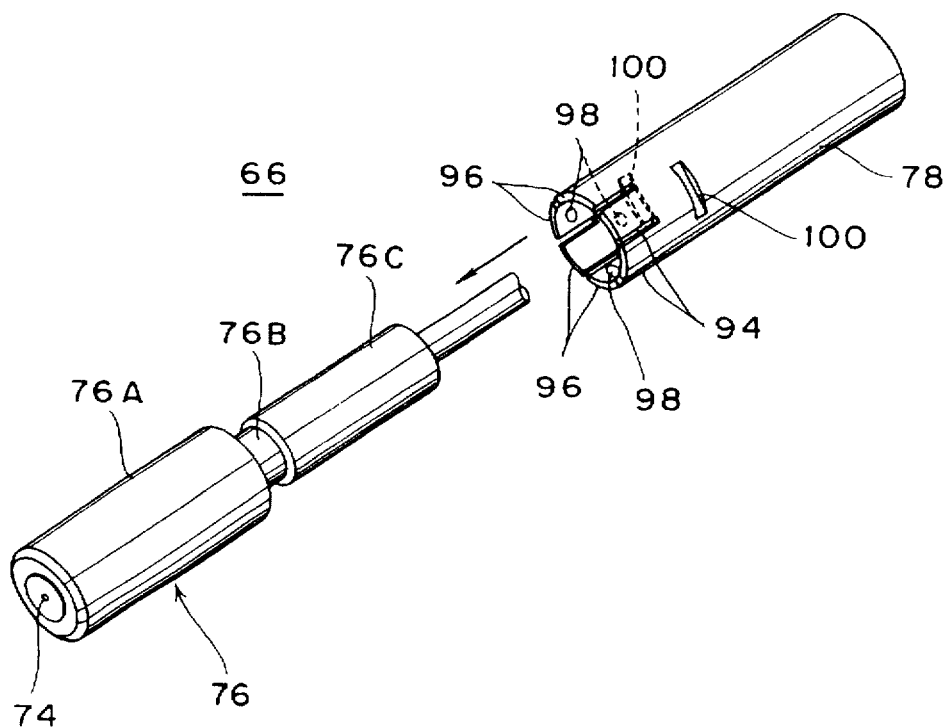
FIG. 9 is an exploded perspective view of an optical connector 66.

FIG. 9 is an exploded perspective view of the optical connector 66 (see FIGS. 5 and 6). The optical connector 66 is composed of an optical fiber 74, a cylindrical connector ferrule 76 for centrally holding the optical fiber 74, and a rotating member 78 rotatable with respect to the connector ferrule 76. The connector ferrule 76 is integrally formed with a first portion 76A having an outer diameter to be fitted in the sleeve 60 (see FIG. 7), a second portion 76B smaller in diameter than the first portion 76A, and a third portion 76C larger in diameter than the second portion 76B and smaller in diameter than the first portion 76A. The first to third portions 76A to 76C are arranged in this order from an end face of the optical fiber 74.

The rotating member 78 has a substantially cylindrical shape as to surround the second and third portions 76B and 76C of the connector ferrule 76. A front end portion of the rotating member 78 is formed with six tongue portions 96 separated by six slits 94. Three projections 98 are formed on the inside surfaces of alternate ones of the six tongue portions 96. Accordingly, when the rotating member 78 is mounted to the connector ferrule 76 in a direction shown by an arrow in FIG. 9, the tongue portions 96 having the projections 98 are elastically deformed to come into engagement with the second portion 76B of the connector ferrule 76, thus rotatably supporting the rotating member 78 to the connector ferrule 76. The outer surface of the rotating member 78 is formed with a pair of notches 100 opposed to each other. These notches 100 serve to facilitate mounting/demounting of the optical connector 66 in cooperation with the U-shaped spring 62 (see FIGS. 5, 6, and 7). This operation will be described below more specifically.

The mounting/demounting operation of the optical connector 66 will now be described with reference to FIGS.

Figure 10A:
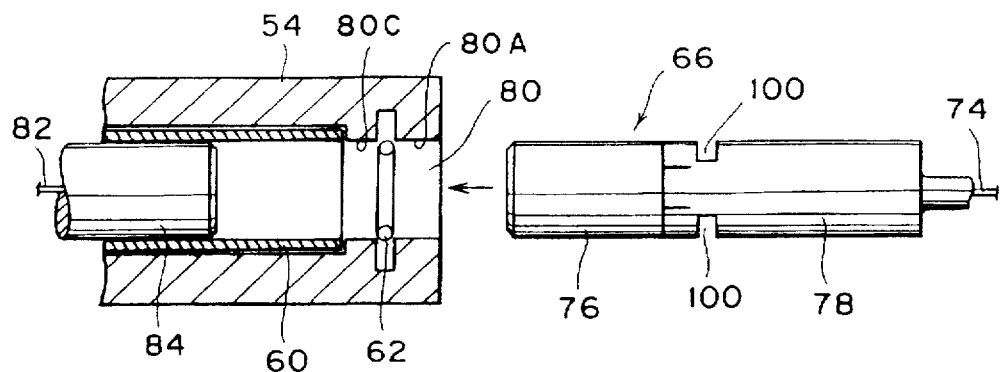
FIGS. 10A to 10C are views for illustrating a mounting/demounting operation of the optical connector 66.

10A, 10B, and 10C. As shown in FIG. 10A, the optical connector 66 starts to be inserted into the hole 80 of the housing 54. The connector ferrule 76 and the rotating member 78 of the optical connector 66 have a diameter slightly smaller than that of the first and third portions 80A and 80C of the hole 80 of the housing 54. Accordingly, when the connector ferrule 76 starts to be inserted into the hole 80, the pair of spring pins of the U-shaped spring 62 are deformed outward by the connector ferrule 76, and the connector ferrule 76 is then inserted into the sleeve 60.

Figure 10B:
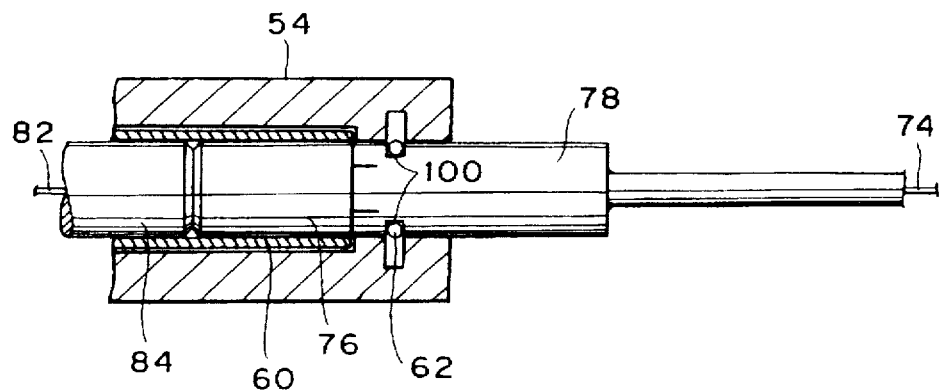

When the optical connector 66 is further inserted, the pair of spring pins of the U-shaped spring 62 deformed outward come into engagement with the notches 100 of the rotating member 78 as shown in FIG. 10B. At this time, the movable ferrule 84 is slightly retracted by the front end of the connector ferrule 76. The retraction of the movable ferrule 84 contracts the coil spring 58 (see FIG. 7, for example), so that a force of pressing the movable ferrule 84 against the connector ferrule 76 is given by the coil spring 58. Thus, optical coupling is obtained between the optical fiber 74 in the optical connector 66 and the optical fiber 82 in the optical assembly 56.

A fabrication technique for aligning the thin hole in the connector ferrule 76 and the thin hole in the movable ferrule 84 has already been established. Further, in the condition shown in FIG. 10B, the connector ferrule 76 and the ferrule 84 are held in alignment with each other by the sleeve 60. Accordingly, the opposed end faces of the optical fibers 74 and 82 come to close contact with each other, thereby obtaining the optical coupling. By polishing the opposed end faces of the optical fibers 74 and 82 to substantially spherical surfaces, for example, a close contact force between the opposed end faces of the optical fibers 74 and 82 can be enlarged to thereby reduce a coupling loss due to Fresnel reflection.

In this preferred embodiment, the abutment force between the connector ferrule 76 and the ferrule 84 is given by the coil spring 58 provided in the optical semiconductor module. Accordingly, it is unnecessary to use a spring in the optical connector 66, thereby simplifying the configuration of the optical connector 66.

Figure 10C:
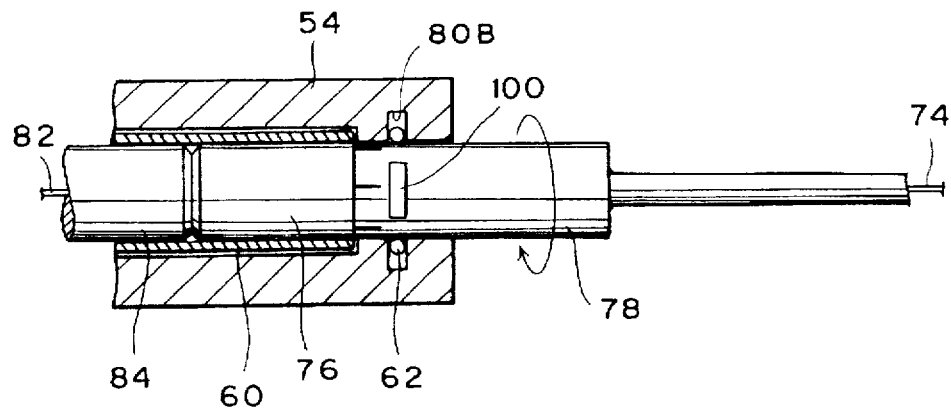

In removing the optical connector 66 from the optical semiconductor module, the rotating member 78 is rotated as shown in FIG. 10C, thereby disengaging the spring pins of the U-shaped spring 62 from the notches 100. By this disengaging operation, the spring pins of the U-shaped spring 62 are deformed outward to be retracted into the second portion 80B of the hole 80 in the housing 54, thereby allowing easy removal of the optical connector 66 from the optical semiconductor module. In the operation of mounting or removing the optical connector 66 to or from the optical semiconductor module, it is unnecessary to rotate the connector ferrule 76 relative to the ferrule 84, but it is sufficient to rotate the rotating member 78 only. Accordingly, there is no possibility that the opposed end faces of the optical fibers 74 and 82 may be rubbed against each other by rotation, so that no flaws may arise on the end face of the optical fiber 74 and/or the end face of the optical fiber 82.

As mentioned above, the movable ferrule 84 is displaceable in a direction parallel to its optical axis (the axial direction of the optical fiber 82) within the range of movement of the stopper 64 in the seventh portion 80G of the hole 80. Further, the movable ferrule 84 is displaceable also in a direction perpendicular to its optical axis within this range.

Figure 11A:
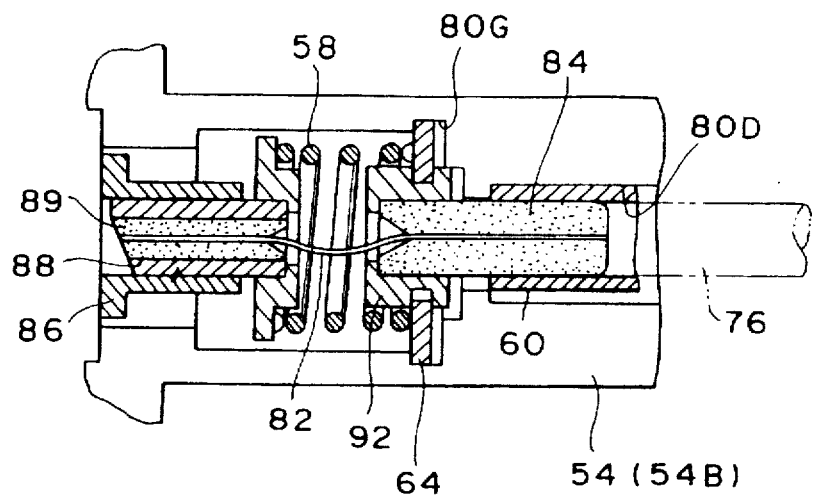
FIGS. 11A and 11B are views for illustrating the displacement of a movable ferrule 84 in a direction perpendicular to its optical axis.
Figure 11B:
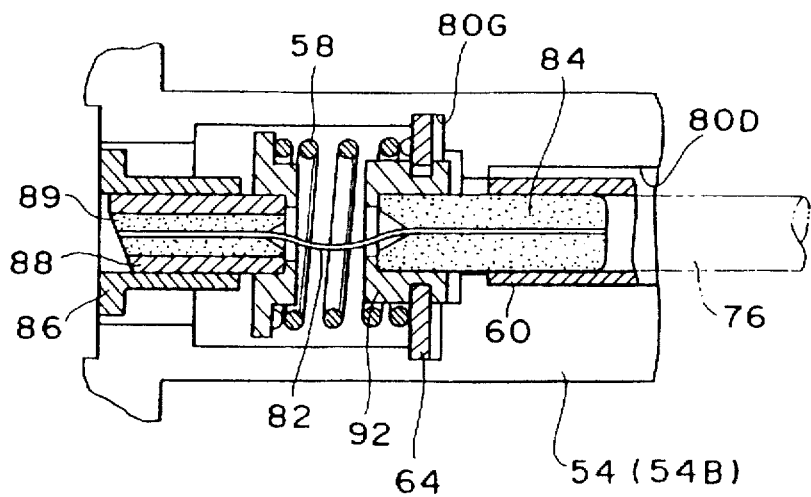

FIGS. 11A and 11B are sectional views for illustrating the displacement of the movable ferrule 84 in the direction perpendicular to the optical axis. In this preferred embodiment, there is defined a gap between the stopper 64 and the movable flange member 92 in the direction perpendicular to the optical axis, and there is also defined a gap between the sleeve 60 and the fourth portion 80D of the hole 80. Accordingly, the ferrule 84, the sleeve 60, and the movable flange member 92 are displaceable in the direction perpendicular to the optical axis within the range shown in FIGS. 11A and 11B. Accordingly, in mounting the optical connector 66, a tolerance of position of the connector ferrule 76 in the direction perpendicular to the optical axis can be enlarged. That is, by forming a slightly tapering portion at the front end of the connector ferrule 76, the sleeve 60 is moved in the direction perpendicular to the optical axis as following the insertion of the connector ferrule 76 into the sleeve 66, thereby facilitating the mounting operation of the optical connector 66.

In this preferred embodiment, the abutment force between the connector ferrule 76 and the ferrule 84 given by the coil spring 58 when the optical connector 66 is mounted is set at about 1 kgf, for example.

In the preferred embodiment described above, the movable ferrule 84 is in a floating structure with respect to the housing 54 in both the direction parallel to the optical axis and the direction perpendicular to the optical axis. Accordingly, even if the movable ferrule 84 is displaced in association with the mounting operation of the optical connector 66, the displacement of the movable ferrule 84 is absorbed by the coil spring 58, and an undesired stress is therefore prevented from acting on the fixed ferrule 89. As a result, it is possible to prevent that nonuniform forces may act on the joint portions between the fixed ferrule 89, the fixed sleeve 88, the fixed flange member 86, and the holder 44, so that optical coupling between the first end 82A of the optical fiber 82 and the optical semiconductor chip 16 can be stably maintained. Thus, it is possible to provide an optical semiconductor module having a high reliability which can endure repetition of mounting/demounting of the optical connector 66.

Further, the fixed ferrule 89 and the movable ferrule 84 have the tapering recesses 89C and 84C at the opposed end faces, respectively. Therefore, a movable range of the optical fiber 82 at each opposed face can be limited within the range of a tapering angle of each tapering recess, thereby suppressing generation of large bending stresses at the opposite ends of an exposed portion of the optical fiber 82 between the fixed ferrule 89 and the movable ferrule 84.

Further, the displacement of the movable ferrule 84 in the direction parallel to the optical axis is limited within the range of movement of the stopper 64 in the seventh portion 80G of the hole 80 of the housing 54. Accordingly, in the event that the optical connector 66 is excessively inserted into the hole 80 of the housing 54, possible damage to the optical fiber 82 can be prevented.

Particularly in this preferred embodiment, the exposed portion of the optical fiber 82 between the fixed ferrule 89 and the movable ferrule 84 is preliminarily flexed in the most expanded condition of the coil spring 58 as shown in FIG. 7. This is due to the following reason. By preliminarily giving such flexure to the optical fiber 82, the optical fiber 82 can be further flexed in the same direction as the direction of the preliminarily flexure in mounting the optical connector 66. Therefore, as compared with the case that the exposed portion of the optical fiber 82 is preliminarily set substantially straight in the most expanded condition of the coil spring 58, it is possible to reduce a force acting on the optical fiber 82 at the beginning of contraction of the coil spring 58 in the inserting operation of the optical connector 66.

In the case that the range of movement of the movable ferrule 84 in the direction parallel to the optical axis is 2 mm, and the length of the exposed portion of the optical fiber 82 is 11 mm, a radius of curvature of the exposed portion of the optical fiber 82 becomes about 5 mm by calculation. Accordingly, the curvature of the optical fiber 82 due to the displacement of the movable ferrule 84 is within tolerance from the viewpoints of loss and strength.

In the case of applying the optical semiconductor module according to this preferred embodiment to the electronic equipment 2 as shown in FIG. 1, automation of manufacturing of the plug-in unit 6 can be facilitated. This will be described below more specifically.

In general, a module to which an interface using an optical fiber is applied undergoes a manufacturing limitation on heat resistance of a coating of the optical fiber in mounting the module on a mother board by soldering. That is, a pigtail type of module fixedly having an optical fiber cannot be originally adapted to a flow soldering process suitable for automation.

To the contrary, according to this preferred embodiment, the optical fiber 74 can be demounted from the module by the use of the optical connector 66. Therefore, in mounting the module on the mother board 8 by soldering, the optical connector 66 is preliminarily removed from the module. After the plug-in unit 6 is manufactured through the mounting of the module on the mother board 8, the optical connector 66 is then mounted to the module, thereby obtaining a desired function of the module.

The mounting of the module on the mother board 8 by soldering may be carried out in the following manner, for example. The plurality of lead pins 20 projecting from the printed wiring board 18 in the module as shown in FIG. 6 are engaged into through holes of the mother board 8 corresponding to the lead pins 20, thereby temporarily fixing the module to the mother board 8. In this condition, an automated flow soldering process is performed.

In this preferred embodiment, the first end 82A of the optical fiber 82 is supported by the fixed ferrule 89, and the fixed ferrule 89 is fixed through the sleeve 88 to the fixed flange member 86. Accordingly, positioning of the first end 82A of the optical fiber 82 in both the direction parallel to the optical axis and the direction perpendicular to the optical axis can be facilitated in manufacturing the module.

A fixing method for the optical fiber 82 in the optical assembly 56 will now be described with reference to FIGS. 12A, 12B, and 12C.

Figure 12A:
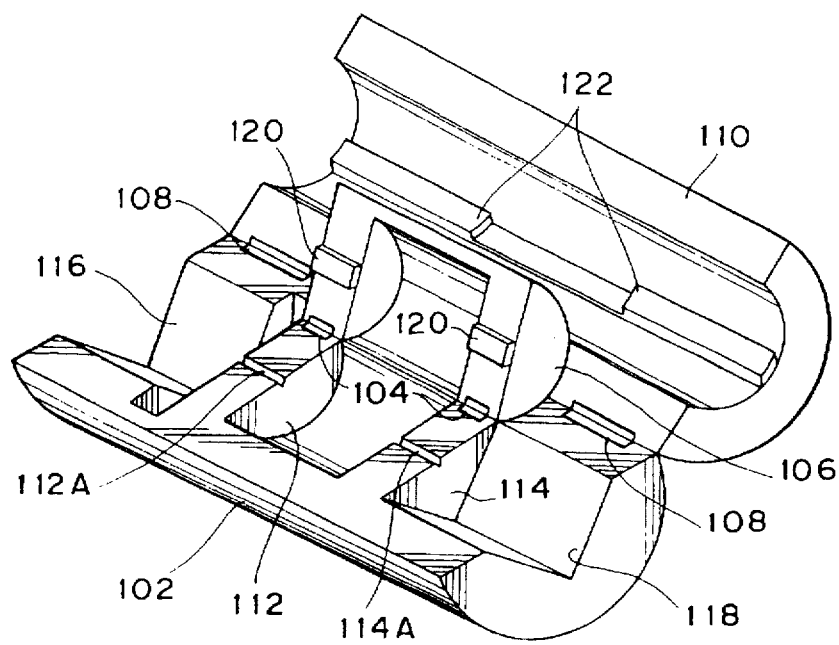
FIGS. 12A to 12C are views for illustrating a fixing method for an optical fiber 82.
Figure 12B:
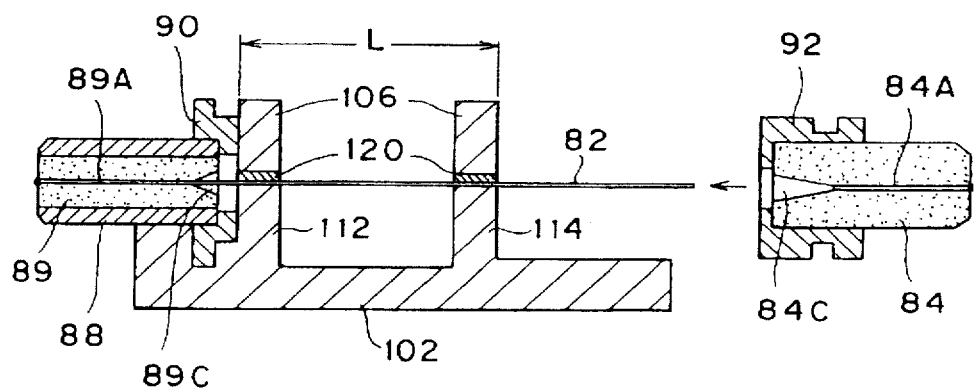
Figure 12C:
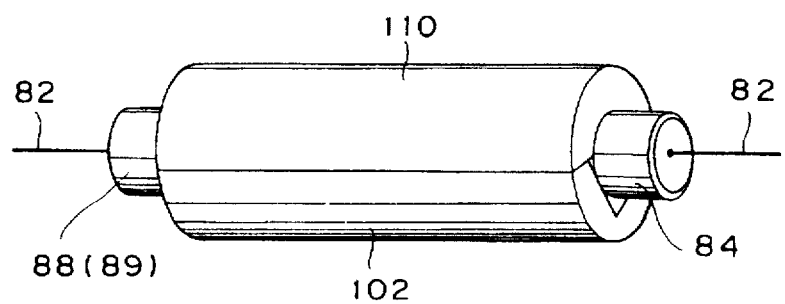

FIG. 12A is a perspective view of a damper applicable to this fixing method. This damper includes a common damper 102, a fiber damper 106 pivotably connected to the common damper 102 by hinges 104, and a ferrule damper 110 pivotably connected to the common damper 102 by hinges 108. The common damper 102 has a damper bed 112 having a V-shaped groove 112A and a damper bed 114 having a V-shaped groove 114A. The common damper 102 further has V-shaped grooves 116 and 118 respectively formed outside of the damper beds 112 and 114. The V-shaped grooves 112A and 114A are provided to seat the optical fiber 82. The V-shaped groove 116 is provided to seat the fixed ferrule 89 and the fixed sleeve 88. The V-shaped groove 118 is provided to seat the movable flange member 92 and the movable ferrule 84. To reliably seat the optical fiber 82 in the V-shaped grooves 112A and 114A, the fiber damper 106 is provided with elastic members 120 formed of rubber or the like. Similarly, to reliably seat the ferrules and the other elements in the V-shaped grooves 116 and 118, the ferrule damper 110 is provided with elastic members 122 formed of rubber or the like.

A method of inserting and fixing the optical fiber 82 into the fixed ferrule 89 and the movable ferrule 84 will now be described with reference to FIG. 12B. An optical adhesive is preliminarily injected from the tapering recess 89C into the thin hole 89A of the fixed ferrule 89. Similarly, an optical adhesive is preliminarily injected from the tapering recess 84C into the thin hole 84A of the movable ferrule 84. The assembly of the fixed ferrule 89, the fixed sleeve 88, and the ring member 90 is next seated in the V-shaped groove 116 of the common damper 102. In this condition, the optical fiber 82 is inserted from the tapering recess 89C into the thin hole 89A of the ferrule 89. In the next step, the optical fiber 82 projecting from the tapering recess 89C is seated in the V-shaped grooves 112A and 114A of the common damper 102, and clamped by the fiber damper 106 and the elastic members 120. In this condition, a free end of the optical fiber 82 is inserted from the tapering recess 84C into the thin hole 84A of the movable ferrule 84, and the assembly of the movable flange member 92 and the movable ferrule 84 is seated in the V-shaped groove 118 of the common damper 102. In this condition, the ferrule damper 110 is closed with the fiber damper 106 kept closed to cure each optical adhesive. This condition is shown in FIG. 12C.

The opposite ends of the optical fiber 82 project from the end faces of the fixed ferrule 89 and the movable ferrule 84 at this time. After cutting off projecting portions of the optical fiber 82, the opposite ends of the optical fiber 82 and the end faces of the ferrules 84 and 89 are polished together. Since all of the optical fiber 82 and the ferrules 84 and 89 are supported by the common damper 102, the fiber damper 106, and the ferrule damper 110 in polishing the opposite ends of the optical fiber 82 and the end faces of the ferrules 84 and 89, the polishing operation can be easily performed. As mentioned above, the polishing operation can be performed by simultaneously polishing the opposite ends of the optical fiber 82 and the end faces of the ferrules 84 and 89 after cutting off the projecting portions of the optical fiber 82 projecting from the ferrules 84 and 89. The length of the exposed portion of the optical fiber 82 can be set according to a distance L between the damper beds 112 and 114, so that an amount of flexure of the exposed portion of the optical fiber 82 can be easily set.

Figure 13:
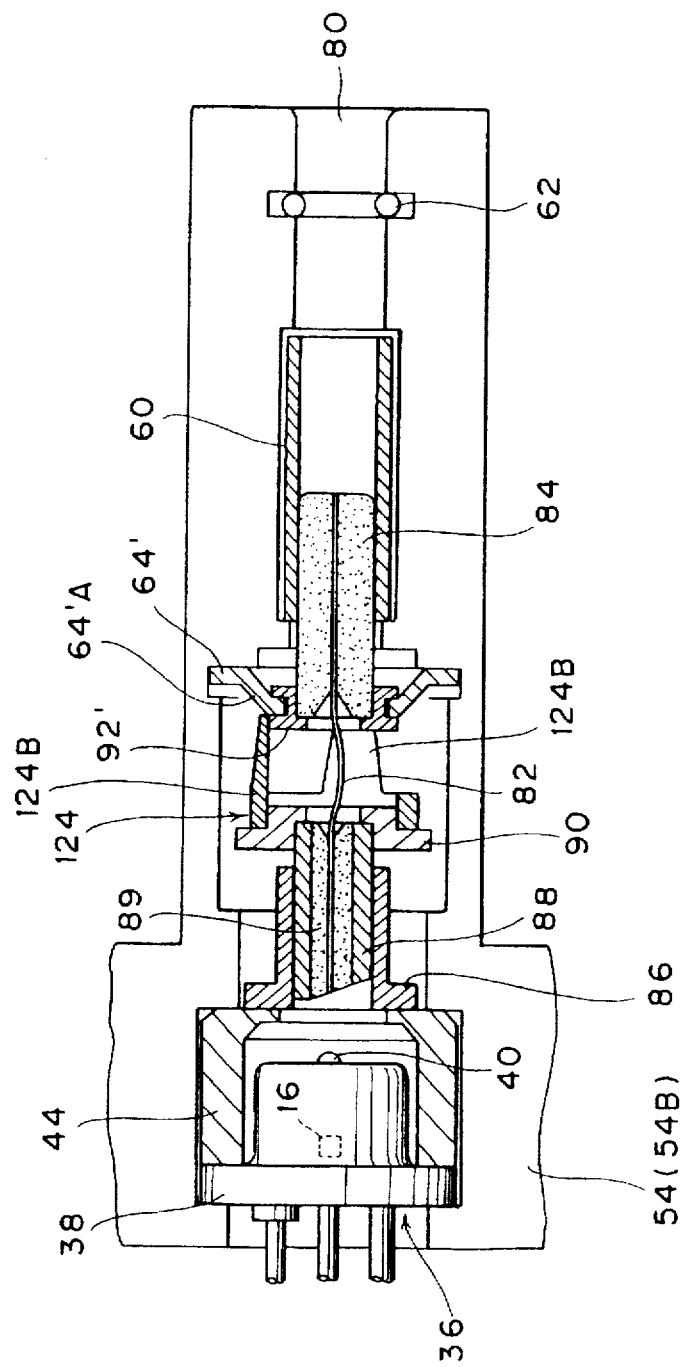
FIG. 13 is a sectional view of an essential part of a second preferred embodiment of the optical semiconductor module according to the present invention.
Figure 14A:
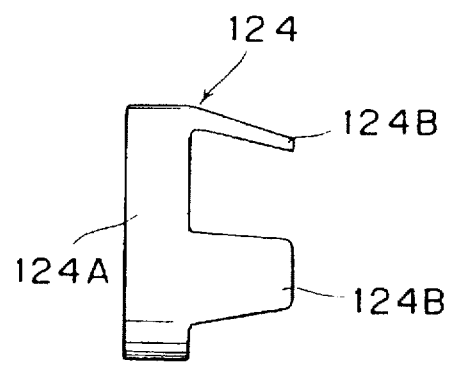
FIGS. 14A and 14B are a side view and an elevational view of a leaf spring member 124, respectively.
Figure 14B:
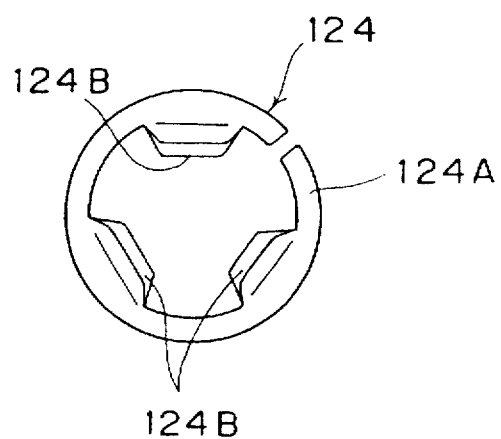

FIG. 13 is a sectional view of an essential part of a second preferred embodiment of the optical semiconductor module according to the present invention. In this preferred embodiment, a leaf spring member 124 is used to bias the movable ferrule 84 in such a direction as to move it away from the fixed ferrule 89. As well shown in FIGS. 14A and 14B, the leaf spring member 124 is composed of a C-shaped ring portion 124A and three leaf spring portions 124B integral with the ring portion 124A. As shown in FIG. 13, a stopper 64' having a tapering surface 64'A against which the front ends of the leaf spring portions 124B of the leaf spring member 124 abut is used in correspondence with the use of the leaf spring member 124, and a movable flange member 92' having a modified shape is used in correspondence with the use of the stopper 64'. The reason why the stopper 64' has the tapering surface 64'A is to convert an inward contracting force of each leaf spring portion 124B of the leaf spring member 124 into a force of biasing the movable ferrule 84 rightward as viewed in FIG. 13.

The leaf spring member 124 may be formed of SUS material or phosphor bronze, for example. In the case that the thickness, length, and width of each leaf spring portion 124B are set to 600 μm, 10 mm, and 1.5 mm, respectively, and that the leaf spring member 124 is formed of stainless steel (SUS304-CSP), the tolerances of the length, width, and thickness of each leaf spring portion 124B are ±0.1 mm, ±0.1 mm, and ±0.02 mm, respectively, for example, so as to suppress the abutment force between the movable ferrule 84 and the connector ferrule 76 (see FIG. 9, for example) within a range of 1.0±0.2 kgf.

Figure 15:
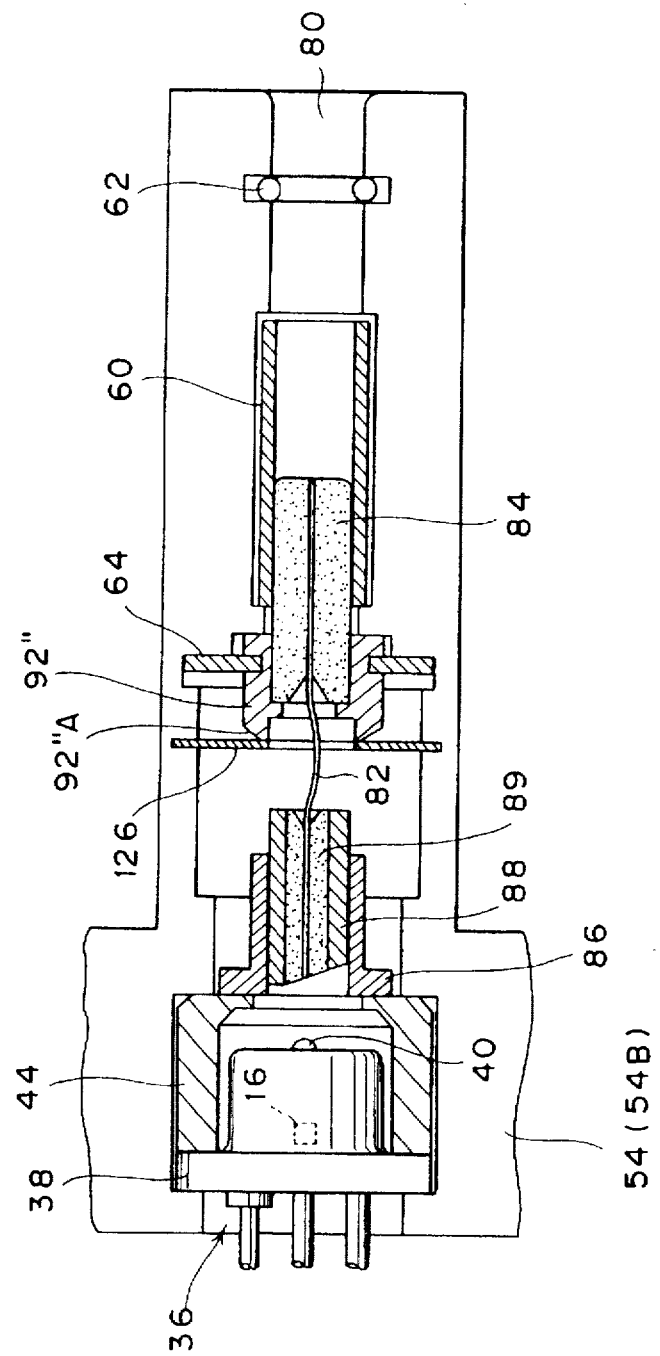
FIG. 15 is a sectional view of an essential part of a third preferred embodiment of the optical semiconductor module according to the present invention.

FIG. 15 is a sectional view of an essential part of a third preferred embodiment of the optical semiconductor module according to the present invention. In this preferred embodiment, a disk-shaped leaf spring member 126 is used in place of the leaf spring member 124 shown in FIG. 13. As well shown in FIG. 16, the leaf spring member 126 has four leaf spring portions 126C obtained by forming one slit 126A and three cutouts 126B in a disk-shaped sheet metal. As shown in FIG. 15, a movable flange member 92" having a tapering surface 92"A against which the front ends of the leaf spring portions 126C of the leaf spring member 126 abut is used in correspondence with the use of the leaf spring member 126. In the case that the leaf spring member 126 is formed of phosphor bronze (C5210P), and that the length, average width, and thickness of each leaf spring portion 126C are set within ranges of 9.0±0.1 mm, 1.5±0.1 mm, and 0.6±0.03 mm, respectively, the abutment force between the movable ferrule 84 and the connector ferrule 76 can be suppressed within a range of 1.0±0.2 kgf.

Figure 17A:
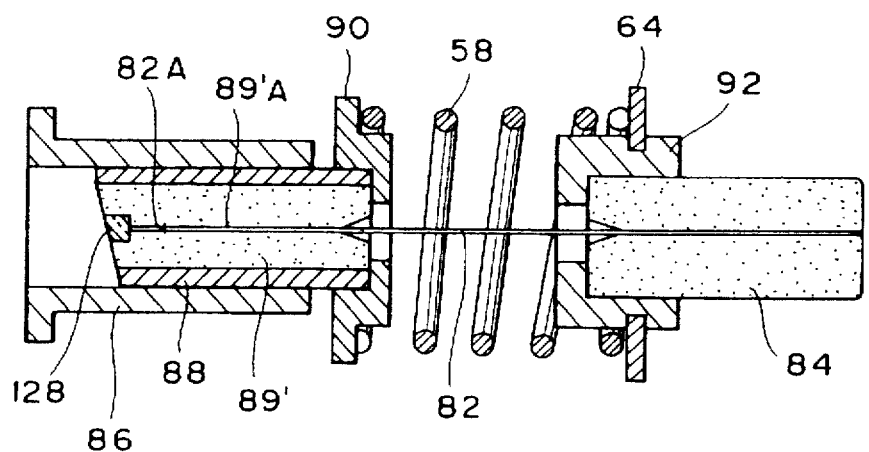
FIGS. 17A and 17B are sectional views of an essential part of a fourth preferred embodiment of the optical semiconductor module according to the present invention.
Figure 17B:
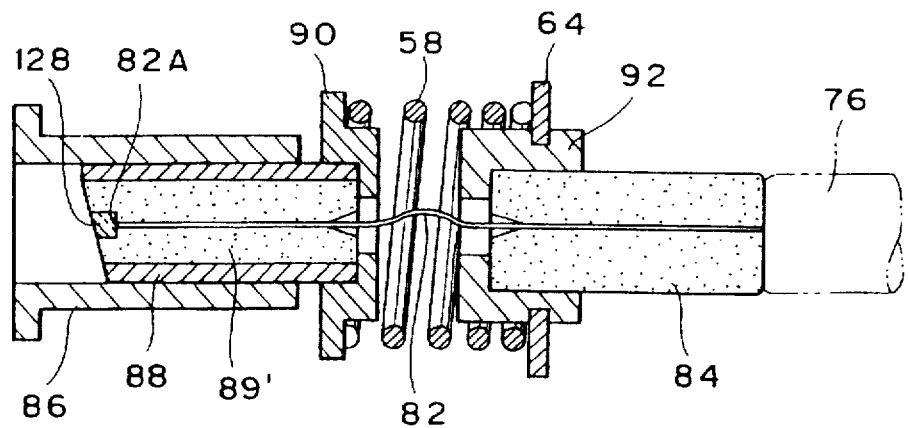

FIGS. 17A and 17B are sectional views of an essential part of a fourth preferred embodiment of the optical semiconductor module according to the present invention. FIG. 17A shows an expanded condition of the coil spring 58 obtained by removing the optical connector 66, and FIG. 17B shows a contracted condition of the coil spring 58 obtained by mounting the optical connector 66 and pressing the connector ferrule 76 against the movable ferrule 84. In this preferred embodiment, the first end 82A of the optical fiber 82 is slidably inserted in a thin hole 89'A of a fixed ferrule 89' rather than fixed in the thin hole 89'A. A glass block 128 is embedded in an end portion of the fixed ferrule 89'.

In the condition where the optical connector 66 has been removed, the exposed portion of the optical fiber 82 between the fixed ferrule 89' and the movable ferrule 84 is straight, and the first end 82A of the optical fiber 82 is separate from the glass block 128 as shown in FIG. 17A. When the optical connector 66 is mounted to press the connector ferrule 76 against the movable ferrule 84 and thereby move the movable ferrule 84 leftward as viewed in FIG. 17B, the exposed portion of the optical fiber 82 is flexed, and the first end 82A of the optical fiber 82 comes to abutment against the glass block 128 by an elastic restoring force of the flexed exposed portion of the optical fiber 82. Accordingly, in this preferred embodiment, when the first end 82A of the optical fiber 82 is in abutment against the glass block 128 as shown in FIG. 17B, the optical fiber 82 and the optical semiconductor chip 16 are optically coupled to each other through the glass block 128.

When the first end 82A of the optical fiber 82 is separated from the glass block 128, the efficiency of optical coupling between the optical fiber 82 and the optical semiconductor chip 16 is remarkably reduced. Accordingly, the optical coupling can be switched on/off in concert with the mounting/demounting operation of the optical connector 66 according to this preferred embodiment, thus providing great convenience in practical use.

In general, a cut end face of an optical fiber has a burr at the edge. Accordingly, to prevent damage to the first end 82A of the optical fiber 82 or the glass block 128 due to such a burr, the first end 82A of the optical fiber 82 is preferably worked into a spherical surface by heating, for example, after cutting the optical fiber 82.

According to the present invention as described above, it is possible to provide an optical semiconductor module having a high reliability which can endure repetition of mounting/demounting of an optical connector.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical semiconductor module comprising:

a housing having a hole into which a connector ferrule is inserted;

an optical semiconductor assembly accommodated in said housing;

an optical fiber having a first end and a second end;

means for supporting said first end of said optical fiber so that said first end is optically coupled to said optical semiconductor assembly;

a movable ferrule having a thin hole in which said second end of said optical fiber is inserted and fixed;

a sleeve accommodated in said hole of said housing, so as to align said movable ferrule and said connector ferrule with each other; and means for biasing said movable ferrule so as to press said movable ferrule against said connector ferrule in said sleeve.

2. An optical semiconductor module according to claim 1, further comprising:

a printed wiring board electrically connected to said optical semiconductor assembly;

said printed wiring board having a plurality of lead pins for mounting said optical semiconductor module on a mother board.

3. An optical semiconductor module according to claim 1, wherein said supporting means comprises a fixed ferrule fixed to said optical semiconductor assembly and having a thin hole in which said first end of said optical fiber is inserted and fixed.

4. An optical semiconductor module according to claim 3, wherein each of said movable ferrule and said fixed ferrule has a conical tapering recess for introducing said optical fiber into said thin hole of each ferrule.

5. An optical semiconductor module according to claim 3, further comprising:

a movable flange member fixed to said movable ferrule; and a stopper for limiting movement of said movable flange-member in said hole-of said housing.

6. An optical semiconductor module according to claim 5, further comprising:

a ring member fixed to said fixed ferrule;

said biasing means comprising a coil spring interposed between said ring member and said stopper.

7. An optical semiconductor module according to claim 5, wherein:

said stopper has a tapering surface inclined with respect to said hole of said housing;

said biasing means comprising a plurality of leaf springs abutting against said tapering surface.

8. An optical semiconductor module according to claim 5, wherein:

said movable flange member has a tapering surface inclined with respect to said hole of said housing;

said biasing means comprising a plurality of leaf springs abutting against said tapering surface.

9. An optical semiconductor module according to claim 1, wherein said hole of said housing has a large-diameter portion for loosely accommodating said sleeve.

10. An optical semiconductor module according to claim 1, further comprising an optical connector including said connector ferrule and adapted to be mounted/demounted with respect to said optical semiconductor module.

11. An optical semiconductor module according to claim 10, wherein:

said optical connector further includes a rotating member rotatable with respect to said connector ferrule;

said rotating member having an outer surface formed with a notch;

said optical semiconductor module further comprising a U-shaped spring provided in said hole of said housing so as to engage said notch;

whereby a connected condition where said connector ferrule and said movable ferrule abut against each other is provided, and said connected condition can be canceled by rotating said rotating member.

12. An optical semiconductor module according to claim 10, wherein:

said supporting means comprises a fixed ferrule fixed to said optical semiconductor assembly and having a thin hole in which said first end of said optical fiber is slidably inserted;

said fixed ferrule having a glass block against which said first end of said optical fiber is abuttable so that when said optical connector is mounted, said first end comes to abutment against said glass block, whereas when said optical connector is demounted, said first end is separated from said glass block.

* * * * *